United States Patent
Yang et al.

(10) Patent No.: US 8,837,367 B2
(45) Date of Patent: Sep. 16, 2014

(54) METHOD OF ENHANCING ZONE-BASED SERVICE

(75) Inventors: Ju-Ting Yang, Taoyuan County (TW); Ho-Sung Chien, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 13/476,025

(22) Filed: May 21, 2012

(65) Prior Publication Data

US 2012/0300760 A1 Nov. 29, 2012

Related U.S. Application Data

(60) Provisional application No. 61/490,043, filed on May 25, 2011.

(51) Int. Cl.
*H04W 4/00* (2009.01)
*H04W 4/02* (2009.01)
*H04W 4/20* (2009.01)

(52) U.S. Cl.
CPC .............. *H04W 4/021* (2013.01); *H04W 4/203* (2013.01)
USPC .......................................... 370/328; 709/224

(58) Field of Classification Search
USPC ................. 370/310, 328, 329, 338, 341, 401; 709/217, 224
See application file for complete search history.

(56) References Cited

U.S. PATENT DOCUMENTS

| 2001/0053134 A1* | 12/2001 | Fillebrown et al. | 370/329 |
| 2011/0231547 A1* | 9/2011 | Yang et al. | 709/224 |
| 2011/0246605 A1* | 10/2011 | Yang et al. | 709/217 |
| 2012/0106563 A1* | 5/2012 | Yang et al. | 370/401 |
| 2012/0263103 A1* | 10/2012 | Yang et al. | 370/328 |
| 2013/0208626 A1* | 8/2013 | Lee et al. | 370/255 |

FOREIGN PATENT DOCUMENTS

| CN | 102209367 A | 10/2011 |
| WO | 2010131860 A2 | 11/2010 |
| WO | 2010134722 A2 | 11/2010 |
| WO | 2011007963 A2 | 1/2011 |

OTHER PUBLICATIONS

Converged Personal Network Service Requirements; Candidate Version 1.0; May 3, 2011; Open Mobile Alliance; OMA-RD-CPNS-V1_0-20110503-C, p. 1-36.
Converged Personal Network Service Core Technical Specification; Candidate Version 1.0; May 3, 2011; Open Mobile Alliance; OMA-TS-CPNS_Core-V1_0-20110305-C, p. 1-246.
Office action mailed on Jun. 4, 2014 for the China application No. 201210167904.4, filed May 25, 2012.

* cited by examiner

*Primary Examiner* — Kerri Rose
(74) *Attorney, Agent, or Firm* — Winston Hsu; Scott Margo

(57) ABSTRACT

A method of enhancing a zone-based service for a personal network entity (PNE) is disclosed. The method comprises sending PNE related information to a personal network gateway (PN-GW); and receiving specific information from the person network gateway; wherein, the specific information is provided based on the PNE related information.

7 Claims, 4 Drawing Sheets

METHOD OF ENHANCING ZONE-BASED SERVICE

CROSS REFERENCE TO RELATED APPLICATIONS

This application claims the benefit of U.S. Provisional Application No. 61/490,043 filed on May 25, 2011 and entitled "Enhanced Interactive Zone-Based Service", contents of which are incorporated herein.

BACKGROUND OF THE INVENTION

1. Field of the Invention

The present invention relates to a method for a zone-based service, and more particularly, to a method of enhancing zone-based service in a personal network gateway.

2. Description of the Prior Art

More and more users connect their electronic devices to small range Personal Network (PN), such as a home network, an in-car network and a body area network. Connection between the PN and other networks expands access ability of electronic devices or a Personal Network Entity (PNE) of the PN and realizes many services, such as using PNE outside of PN to access various services. For example, a personal media player connected to the Bluetooth network can receive video contents from the Internet via a cellular phone connecting to the Wide Area Network (WAN).

Open Mobile Alliance (OMA) is the focal point for the development of mobile service enabler specifications, which supports the creation of interoperable end-to-end mobile services. OMA drives service enabler architectures and open enabler interfaces that are independent of the underlying wireless networks and platforms. OMA creates interoperable mobile data service enablers that work across mobile devices, service providers, networks, geography and telecommunication firms.

Furthermore, in the communication protocol of OMA, Converged Personal Network Services (CPNS) server, Personal Network Gateway and PNE form a basic architecture of the CPNS. The CPNS server is a CPNS enabler entity, which replies requests from a Personal Network Gateway (PNGW) and ensures that appropriate applications are selected and appropriate contents are provided to the PNEs.

The PNGW serves as an intermediary entity between the PNEs and other networks that forwards the requests and the responses between the PNEs and the other networks. Besides, the PNEs are connected to the PNGW and between each other, and are used for rendering the contents received from the PNGW or from each other.

Other than the PNGW, the Zone Personal Network Gateway (Zone PNGW) is used for providing better service efficiency. In the CPNS, zone means the geographic area which is related to signalings of physical carriers, service providers, or users.

Different from normal PN GW, the concept of Zone PN GW is proposed to provide better service publication and utility. Zone in CPNS is a specific geographic area depending on the signaling capacities of physical bearer used or on the intention of the service provider or users. The concept of the Zone PN GW is that the Zone PN GW searches its zone regularly (periodically) to find out if some PNE which had been located outside of PN enters in. The Zone PN GW broadcasts and/or unicasts the message advertising the existence of Zone PN GW.

Zone Based Service Flow is provided in FIG. 1, which illustrates general flows for Zone Based Services mainly provided through the public PN GW. In FIG. 1, a ServiceDescriptionAdvertise message is sent from the CPNS Server to the PN GW which is a presumed step for the Zone Based Service. After receiving the ServiceDescriptionAdvertise message, the PN GW stores the Service Description, and then checks if the PNE is available for the service based on PN Inventory and will deliver the ServiceDescriptionAdvertise message to the PNE based on ServiceDescriptionAdvertise message, PNE is aware of available services to consume in the Zone. However, under this circumstance, PNE can't interact with PN GW, and can't request more practical, real-time related information inside the zone, either. On the other hand, PN GW has no idea how to provide more detailed, appropriate personalized information inside the zone to each individual PNE.

SUMMARY OF THE INVENTION

It is therefore an objective to provide a method of enhancing zone-based service to provide more interactions for a personal network entity and a personal network gateway.

A method of enhancing a zone-based service for a personal network entity (PNE) is disclosed. The method comprises sending PNE related information to a personal network gateway (PN-GW); and receiving specific information from the person network gateway; wherein, the specific information is provided based on the PNE related information.

A method of enhancing a zone-based service for a personal network gateway (PN-GW) is disclosed. The method comprises receiving PNE related information from a personal network entity (PNE); and sending specific information to the person network entity based on the PNE related information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
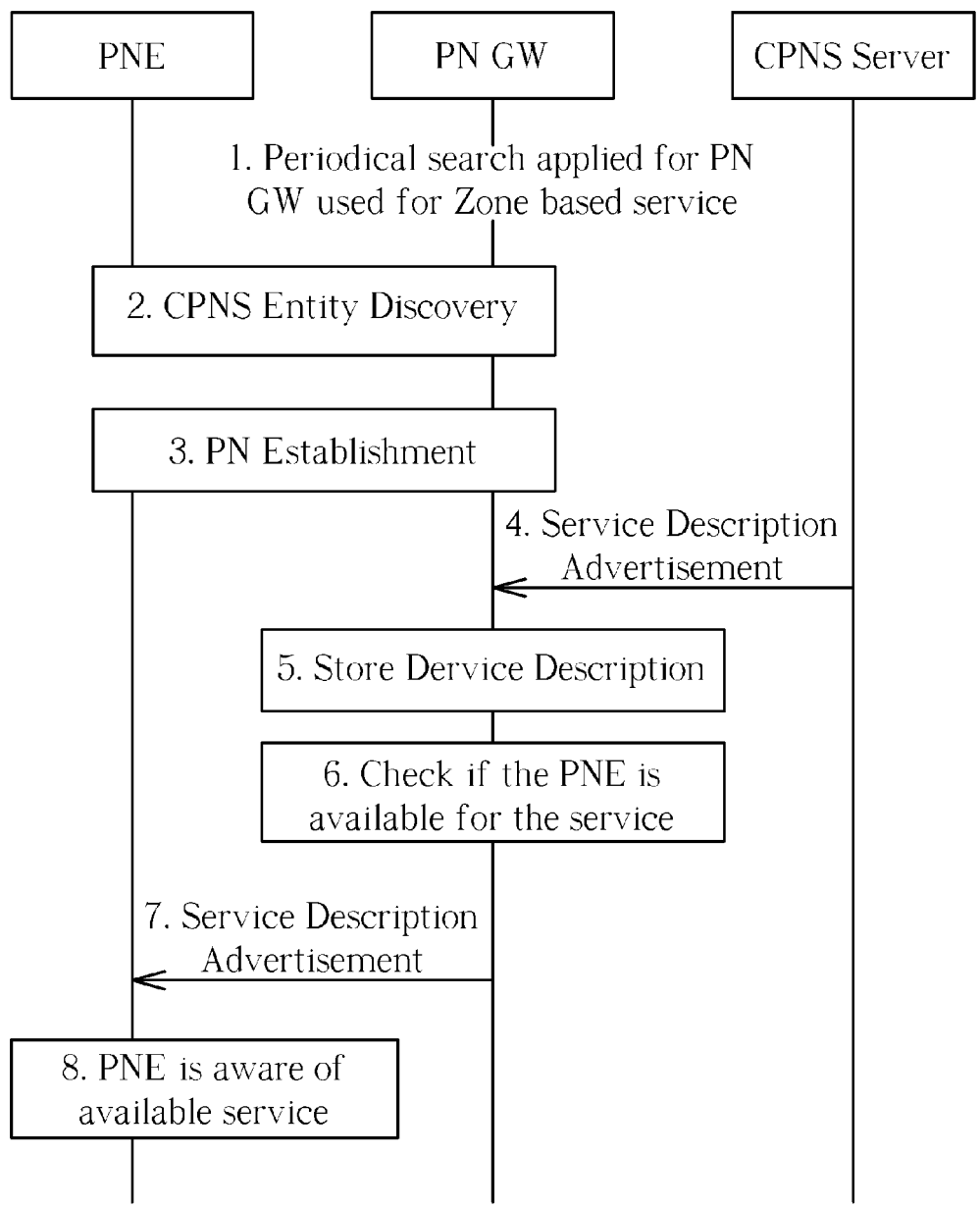
FIG. 1 illustrates a message flow for a zone based service in the prior art.
Figure 2:
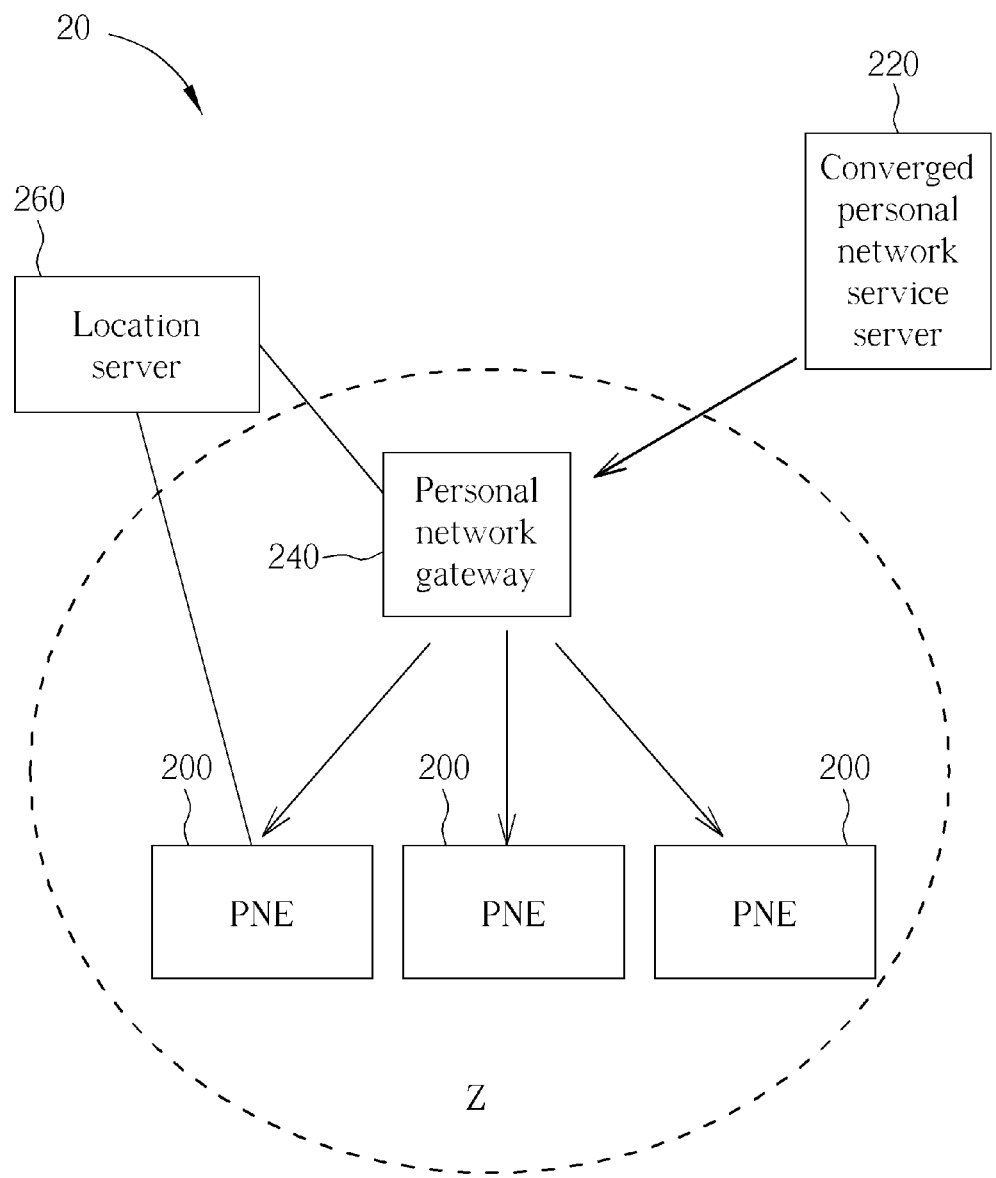
FIG. 2 illustrates a schematic diagram of an exemplary personal network.

Please refer to FIG. 2, which illustrates a schematic diagram of a Personal Network (PN) 20 according to an example of the present disclosure. The PN 20 includes a Converged Personal Network Service (CPNS) server 220, a Personal Network Gateway (PNGW) 240 and a location server 260 and multiple Personal Network Entities (PNEs) 200. The CPNS server 220 provides a zone-based service. The PNGW 240 is used to transmit requests and responses between PNEs 200 and the CPNS server 220. The PNGW 240 can be a Zone Personal Network Gateway, informing the PNEs 200 of existence of the PNGW 240 by broadcasting a message, and providing the zone-based service to a new PNE just entering into a specific zone Z. Preferably, the PNGW 240 can be a mobile device or a set-top box. The PNEs 200 can be a mobile device, a personal computer, a music player, a in-car navigation system or a set-top box. In other words, a mobile device can play as the PNEs 200 or the PNGW 240 according to the users' needs and device capabilities. The location server 260 is connected to the PNE 200 and the PNGW 240, providing location information of the PNE 200. The PNGW 240 can forward the location information to location server 260.

Figure 3:
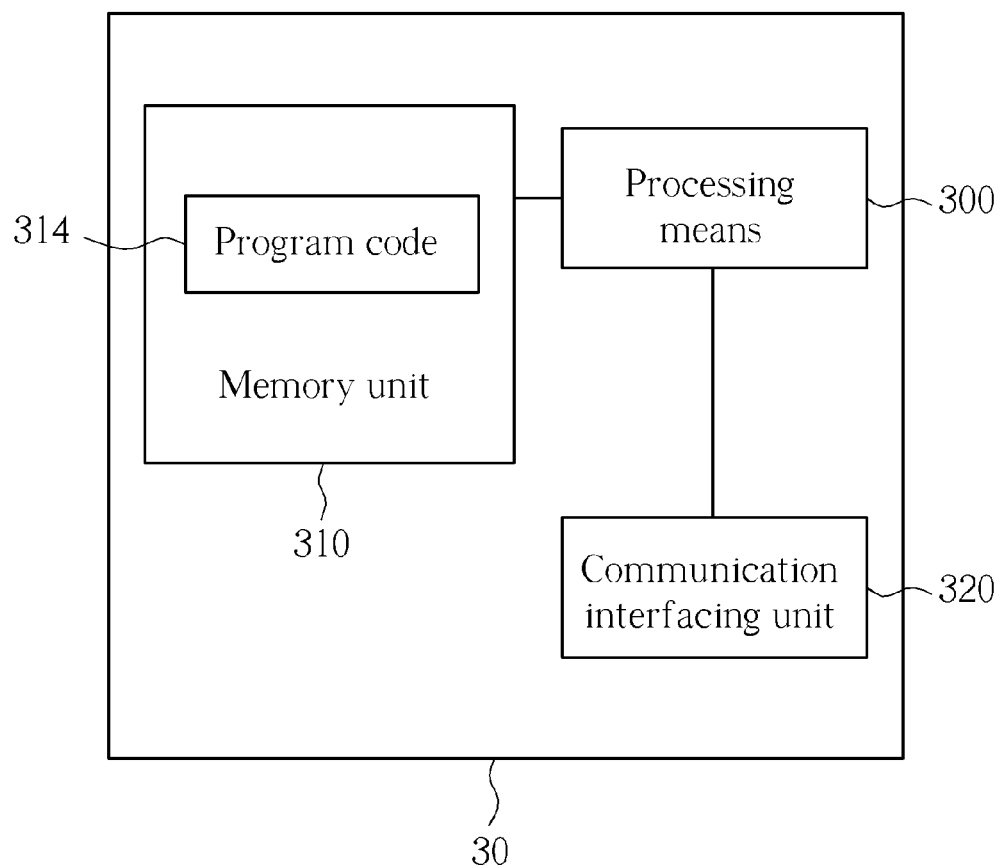
FIG. 3 illustrates a schematic diagram of an exemplary communication device.

Please refer to FIG. 3, which illustrates a schematic diagram of an exemplary communication device 30. The communication device 30 can be the CPNS server 220, the PNGW 240, the PNEs 200. The communication device 30 can include a processing means 300 such as a microprocessor or ASIC, a memory unit 310, and a communication interfacing unit 320. The memory unit 310 may be any data storage device that can store program code 314 for access by the processing means 300. Examples of the memory unit 310 include but are not limited to a subscriber identity module (SIM), read-only memory (ROM), random-access memory (RAM), CD-ROMs, magnetic tapes, and optical data storage devices. According to processing results of the processing means 300, the communication interfacing unit 320 can be a radio transceiver or a wire/logical link for communicating with the corresponding communication devices.

Figure 4:
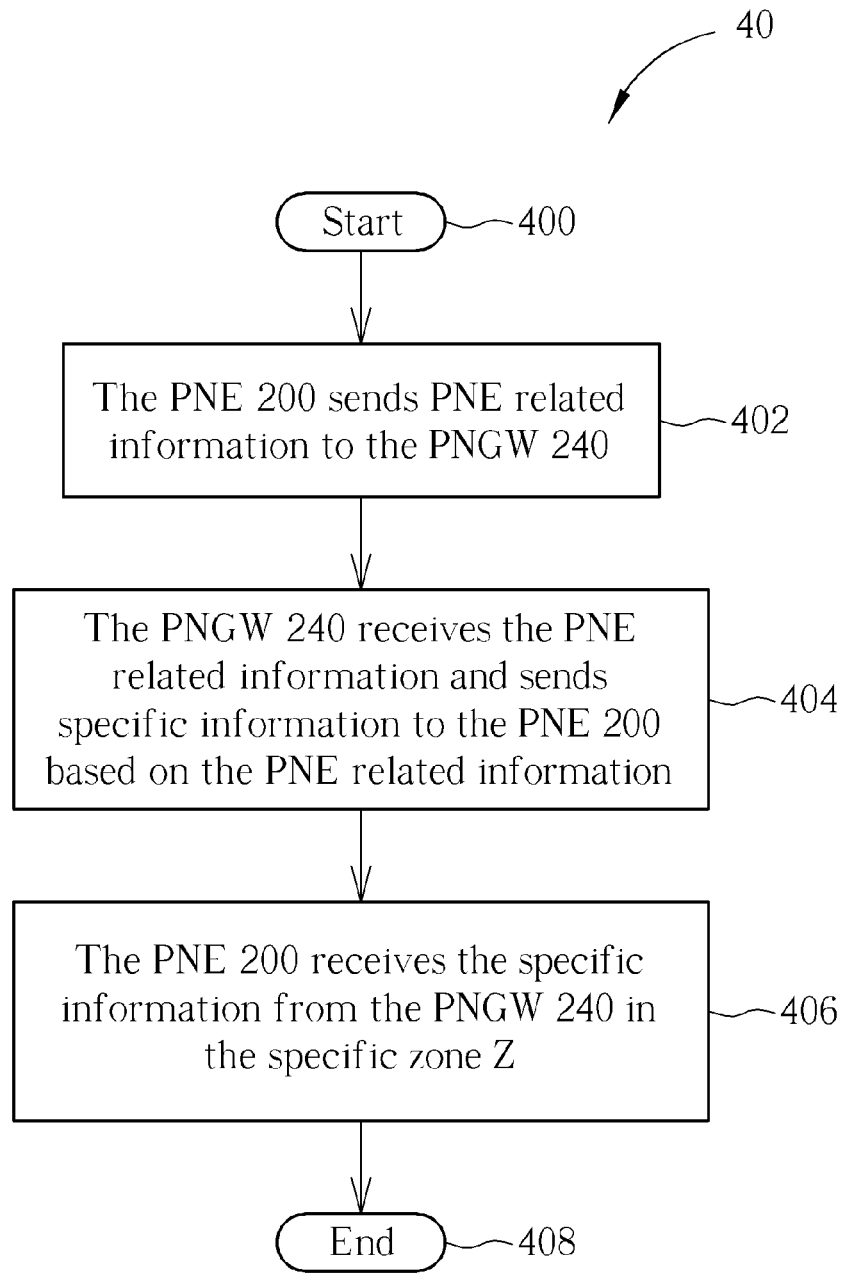
FIG. 4 illustrates a flow chart of an exemplary process.

Please refer to FIG. 4, which illustrates a flow chart of an exemplary process 40. The process 40 can be used in the PN 20 to enhance a zone-based service and initiate the zone-based service. The process 40 can be complied into the program code 314 and includes the following steps:

Step 400: Start.

Step 402: The PNE 200 sends PNE related information to the PNGW 240.

Step 404: The PNGW 240 receives the PNE related information and sends specific information to the PNE 200 based on the PNE related information.

Step 406: The PNE 200 receives the specific information from the PNGW 240 in the specific zone Z.

Step 408: End.

According to the process 40, the PNE 200 sends the PNE related information to the PNGW 240. The PNE related information is sent by the PNE 200 proactively or requested by the PN-GW 240. The PNE related information could include the location information of the PNE 200 and/or device capability of the PNE 200. When the PNGW 240 receives the PNE related information, the PNGW 240 sends the specific information to the PNE 200 based on the PNE related information. The PNE 200 receives the specific information from the PNGW 240 in the specific zone Z. In this situation, the PNE 200 can interact with the PNGW 240 as well as request more practical, real-time related information inside the zone. With the PNE related information, PNGW 240 can provide more detailed, appropriate personalized information inside the zone Z to each individual PNE 200. Namely, the process 40 provides more interaction for the PNE 200 and the PNGW 240.

Preferably, the PNE 200 supports at least one of the various positioning technologies (e.g. OMA SUPL). The PNE 200 performs positioning procedures with the location server 260 (e.g. H-SLP in OMA ULP architecture) to calculate or obtain the location information, which are defined in the various location technologies. The location information can be transmitted from the PNE 200 to the PNGW 240 in a new message or a new information element (IE) (e.g. PNELocationInfo). The location information in the new message/IE includes sign of latitude, latitude, longitude, uncertainty, confidence, altitude, and velocity, but not limited herein.

When the PNGW 240 receives the location information, the PNGW 240 forwards the location information to location server 260 (e.g. H-SLP in OMA ULP architecture) to retrieve location related information if the PNGW 240 is incapable to handle the location information. The location server 260 sends the location information back to the PNGW 240 under the format that PNGW 240 can process further.

In addition, the PNE related information can be the device capabilities of the PNE 200, such device type, video codec, etc. When the PNGW 240 receive the device capabilities of the PNE 200, the Zone PNGW 240 can use the device capabilities of the PNE 200 to provide more specific, real-time information inside the zone.

For example, if the PNGW 240 recognizes the PNE 200 is a MP3 using the knowledge of the device type, the PNGW 240 provides updated information of album release. For another example, if PNGW 240 recognizes the PNE 200 is a GPS device using the knowledge of device type, the PNGW 240 provides real-time map, traffic information and parking information.

Thus, with the PNE related information provided by the PNE 200 proactively or requested by the PNGW 240, the PNGW 240 can provide more specific, real-time information inside the zone Z. For example, the PNE 200 entering the zone Z is a device (such as, mobile phone) in a car. The PNGW 240 can provide useful nearest gas station, nearest restaurants, and real-time map and traffic information. For another example, when the PNE 200 enters the zone Z, which is a large shopping mall, the PNE 200 can interact with the PNGW 240 to request "Query" or "Search" operation for desirable shops or goods in the shopping mall while this information is not covered by the service description advertisement.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 300 processes the program code 314 related to the abovementioned processes and the processed results can enhance the zone-based service in the PN 20.

To sum up, by sending the PNE related information to the PNGW, the PNGW can send the specific information to the PNE based on the PNE related information. Thus, the PNE can interact with the PNGW as well as request more practical, real-time related information inside the zone. With the PNE related information, PNGW can provide more detailed, appropriate personalized information inside the zone to each PNE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of enhancing a zone-based service for a personal network entity (PNE), the method comprising:
    sending PNE related information to a personal network gateway (PN-GW), wherein the PNE related information is either proactively sent to the PN-GW or requested by the PN-GW and the PNE related information comprises at least one of location information of the PNE and device capability of the PNE; and
    receiving specific information from the person network gateway;
    wherein the specific information is provided by the PN-GW based on the PNE related information.

2. The method of claim 1, wherein the PNE and the PN-GW are in a zone in which the zone-based service is provided.

3. The method of claim 1 further comprising supporting at least one of location technologies.

4. The method of claim 1, wherein the location information is included in a message or an information element (IE).

5. A method of enhancing a zone-based service for a personal network gateway (PN-GW), the method comprising:
receiving PNE related information from a personal network entity (PNE), wherein the PNE related information is either proactively sent to the PN-GW or requested by the PN-GW and the PNE related information comprises at least one of location information of the PNE and device capability of the PNE; and
the PN-GW sending specific information to the person network entity based on the PNE related information.

6. The method of claim 5, wherein the PNE and the PN-GW are in a zone in which the zone-based service is provided.

7. The method of claim 5, wherein the PNE related information is included in a message or an information element (IE).

* * * * *